United States Patent
Smith

[19]

[11] Patent Number: 5,829,339
[45] Date of Patent: Nov. 3, 1998

[54] CRIMPED SEALED ADAPTER BUSHING ASSEMBLY FOR A DOUBLE DIAPHRAGM SPRING BRAKE ACTUATOR

[75] Inventor: Teddy Dean Smith, Fresno, Calif.

[73] Assignee: TSE Brakes, Inc., Fresno, Calif.

[21] Appl. No.: 898,236

[22] Filed: Jul. 22, 1997

Related U.S. Application Data

[63] Continuation of Ser. No. 488,917, Jun. 9, 1995, abandoned.

[51] Int. Cl.$^6$ .................................................. F01B 7/00
[52] U.S. Cl. .......................... 92/63; 277/437; 277/540; 277/579; 277/585; 384/295; 384/439
[58] Field of Search ................................. 384/125, 220, 384/222, 295, 428, 438, 439; 188/343, 170; 277/437, 441, 540, 579, 582, 584, 585; 92/63

[56] References Cited

U.S. PATENT DOCUMENTS

| | | | |
|---|---|---|---|
| 1,341,265 | 5/1920 | Dean | 277/183 |
| 1,407,568 | 2/1922 | Page | 277/183 |
| 2,479,398 | 8/1949 | Parsons | 277/183 |
| 2,670,976 | 2/1954 | Owen | 277/189 |
| 2,825,590 | 3/1958 | Sutherland | 277/188 R |
| 3,084,945 | 4/1963 | Alexander | 277/47 |
| 3,194,614 | 7/1965 | Thomas | 384/222 |
| 3,235,271 | 2/1966 | Johnson et al. | 277/47 |
| 3,977,308 | 8/1976 | Swander, Jr. et al. | 92/63 |
| 4,020,910 | 5/1977 | Peterson et al. | 277/182 |
| 4,478,137 | 10/1984 | Clark | 277/189 |
| 4,909,639 | 3/1990 | Belanger | 384/295 |
| 5,161,780 | 11/1992 | Bartoschek et al. | 277/189 |
| 5,526,732 | 6/1996 | Stojic | 92/63 |
| 5,706,714 | 1/1998 | Piette | 92/63 |

OTHER PUBLICATIONS

Undated three–page document by OBI entitled "Introducing Black Max II".
One–page Bendix DD3 parts list dated Apr., 1979.
Undated one–page MGM Model 624–A parts list.
Undated one–page MGM Model 730–parts list.

Primary Examiner—Daniel G. DePumpo
Attorney, Agent, or Firm—Fulbright & Jaworski L.L.P.

[57] ABSTRACT

A sealed bushing assembly adapted to permit a push rod to pass through an adapter isolating a pressurized chamber, formed by attaching a sleeve to said adapter, inserting a bushing, and crimping the end of said sleeve opposite said adapter to restrain said bushing.

22 Claims, 2 Drawing Sheets

CRIMPED SEALED ADAPTER BUSHING ASSEMBLY FOR A DOUBLE DIAPHRAGM SPRING BRAKE ACTUATOR

This is a continuation of application Ser. No. 08/488,917, filed Jun. 9, 1995, now abandoned.

TECHNICAL FIELD OF THE INVENTION

The present invention relates to braking systems operated by air or other fluids, and more particularly, to actuators in which a power spring causes a substantial braking force to be applied to the brake of the vehicle in the event of a loss of pressure in the vehicle's service brake system.

BACKGROUND OF THE INVENTION

A common type of spring-operated brake actuator used on heavy trucks and other commercial vehicles utilizes a powerful compression spring to provide required braking force when the fluid pressure inside a pressure chamber falls below a predetermined minimum, for example, when the vehicle is parked or there is a malfunction in the fluid-operated service brake system. The spring is located between an end wall of a brake actuator housing and a pressurized chamber, with a flexible diaphragm extending across the interior of the housing and dividing it into a un-pressurized spring chamber and a pressurized chamber. The force exerted on the diaphragm by the pressurized fluid exerts a counter-force on the spring, which holds it in a compressed position inside the spring chamber. When the pressure inside the pressurized chamber drops, the unbalanced force exerted by the compression spring is transmitted through the diaphragm to an actuator rod that extends from the pressurized side of the diaphragm to the exterior of the pressurized chamber. In a so-called "double diaphragm" spring brake actuator, a service brake housing is provided in line with the spring brake housing, and a second diaphragm inside the service brake housing transmits any movement of the actuator rod to a second actuator rod, which in turn applies braking force.

Whether the device is a simple spring brake mechanism, or a double diaphragm device, it is necessary to provide a sealing means which allows an actuator rod to transmit the brakes' force from inside the pressurized area of the spring brake housing, through a center adaptor wall, to the exterior of the spring brake housing. The sealing means also serves as a guide, preventing the actuator rod from veering off plumb, as well as a bearing surface for reducing friction.

Such a sealing means must be durable and reliable. If the sealing assembly fails, and allows pressure to escape from the pressure chamber of the spring brake, there will be no adequate counterforce on the spring, which will be released from its compressed position, urging the actuator rod outward and applying the brake. Thus, the vehicle will not be normally operable until the brake is repaired or replaced. Moreover, repair can be a difficult prospect requiring a qualified rebuilder.

Conventional units have taken different approaches to this problem of providing a durable and reliable sealing device. Some prior devices have employed a metallic bushing, made of steel or brass. Unfortunately, attachment is difficult, and any orientational error can result in enhanced wear and early failure. Additionally, metal bushings are not elastically deformable, and therefore will be easily damaged if the push rod is slightly out of alignment. This is not as great a problem with piston type brakes, where the push rod is connected to a piston that slides against parallel brake walls designed to meet high tolerances, but is a much greater problem with a diaphragm style brake, where the push rod may often be subject to incidental horizontal movement, in addition to the vertical movement for which it is designed. Such brakes therefore require an elastically deformable bushing.

Previously, attempts were made to utilize plastic bushings. These efforts were unsuccessful due to the difficulty of securely integrating the plastic bushing with the other components which were metallic. For example, plastic bushings were designed with exterior threads so that they may be threaded into a metal housing. Unfortunately, such threads have been found to be easily striped. Attempts were also made to attach plastic bushings with screws. This method of attachment was found to cause the plastic bushing to wear prematurely and/or crack. This wear was exacerbated by the relatively low state of the plastics art at the time such attempts were made.

Such difficulties have been more acute with actuators having a steel, rather than aluminum, center section. Aluminum is considerably easer to mold, and allows the area surrounding the bushing to be molded into place. A steel center section is made from steel stampings and requires that the bushing area be fabricated.

For reasons of cost and reliability history, some consumers prefer steel actuators over aluminum. Meeting all of the above consumer concerns requires an adapter bushing assembly that utilizes bushings made of the advanced plastics of today and allows them to be secured without threading or screws into a steel center section.

Welded steel has proved to be a less costly material in which to make the adaptor wall. Such adaptor walls must be stamped out of sheets of steel and welded together in place, with fairly loose tolerances.

SUMMARY OF THE INVENTION

Accordingly, the present invention provides an improved spring brake assembly, and method for making the same, which utilizes a bushing made of thermoplastic type material, that can be secured easily and reliably to a steel adaptor base, which will maintain the pressure seal in the spring chamber, and in the case of a double diaphragm device, both the spring chamber and the service brake chamber.

In accordance with the method aspects of the invention, a bushing made of thermoplastic type material is inserted into a sleeve which surrounds an aperture in the adaptor plate, and the bushing is secured by the rim of the aperture at the bushing's lower end, and by crimping of the top of the sleeve, which secures the bushing at its other end.

In accordance with the structural aspects of the invention, a deformable sleeve is perpendicularly attached to an adaptor plate retaining a deformable bushing made of thermoplastic type material. The bushing is also retained by a crimped end of the sleeve. The push rod thereby passes through the bushing.

BRIEF DESCRIPTION OF THE DRAWINGS

The invention can be best understood with reference to the attached drawings, in which.

DETAILED DESCRIPTION OF THE INVENTION

Figure 1:
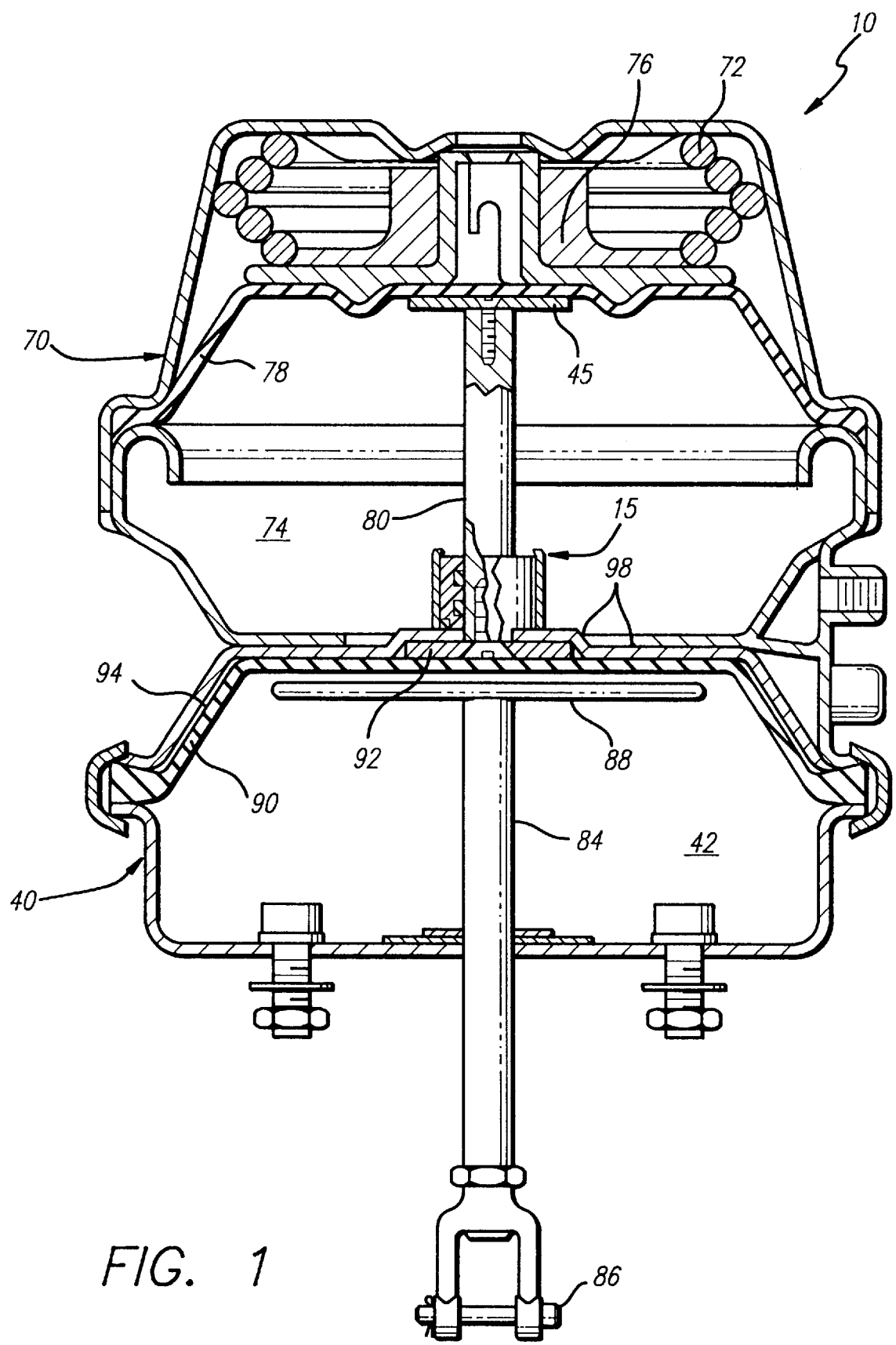
FIG. 1 is a cross-sectional view of a double diaphragm spring brake actuator constructed in accordance with the present invention.

FIG. 1 shows a double diaphragm spring brake actuator 10 constructed in accordance with the present invention. This embodiment includes a spring brake 70 coupled to a service brake 40. The service brake 40 comprises a service brake non-pressurized chamber 42 and a pressure chamber 94 which are separated by a service brake diaphragm 90 and an adaptor plate 98. The service brake non-pressurized chamber 42 also includes a service brake push rod 84, which has a guide end 86 and a plate end 88. The plate end 88 is adjacent to the service brake diaphragm 90, and the guide end 86 is coupled to the brake mechanism (not shown). In normal operation of the vehicle, a user will typically apply the brakes by depressing a brake pedal (not shown). This will result in a fluid being pumped into the service brake pressure chamber 94 causing that chamber to expand. Such expansion forces the service brake diaphragm 90 against a plate end 88 of the service brake push rod 84, urging the push rod 84 away from the spring brake actuator 10. Due to such movement, the guide end 86 activates the brakes (not shown).

The spring brake 70 is coupled to the service brake 40 by means of the adaptor plate 98, which forms both an outer wall of the service brake pressure chamber 94 and an outer wall of the spring brake 70. The spring brake 70 also includes a spring 72 which in normal use is compressed against a spring brake plate 76. The spring brake plate 76 is adjacent to a spring brake diaphragm 78. The spring brake diaphragm 78 forms a wall of a spring brake pressure chamber 74. The spring brake pressure chamber 74 also includes a wall opposite to the spring brake diaphragm 78, formed in part by the adaptor plate 98. A spring brake push rod 80 passes through the adaptor plate 98 through an aperture 18 (FIG. 2B). The spring brake push rod 80 has two ends, a spring end 45 which rests flush against the spring brake diaphragm 78, and an adaptor end 92, which is within the service brake pressure chamber 94, and adjacent to the service brake diaphragm 90.

To facilitate the passage of the spring brake push rod 80 from the spring brake pressure chamber 74 through the adaptor plate 98, a bushing assembly 15 is provided. The bushing assembly can be best understood with reference to FIGS. 2A, 2B and 3.

Figure 2A:
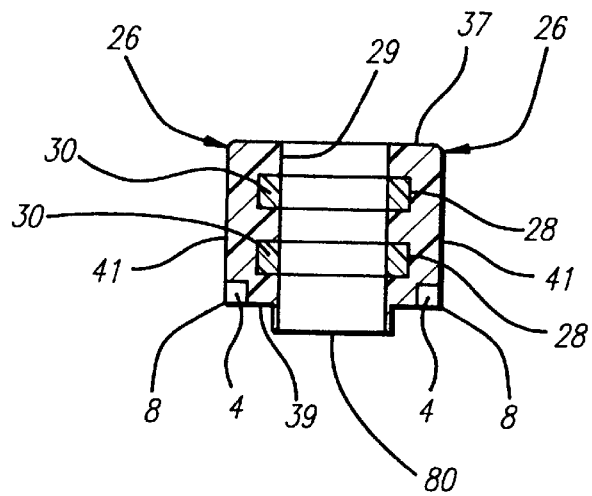
FIG. 2A is a cross-sectional view of the bushing and sealing element portion of the bushing assembly (15) shown in FIG. 1.
Figure 2B:
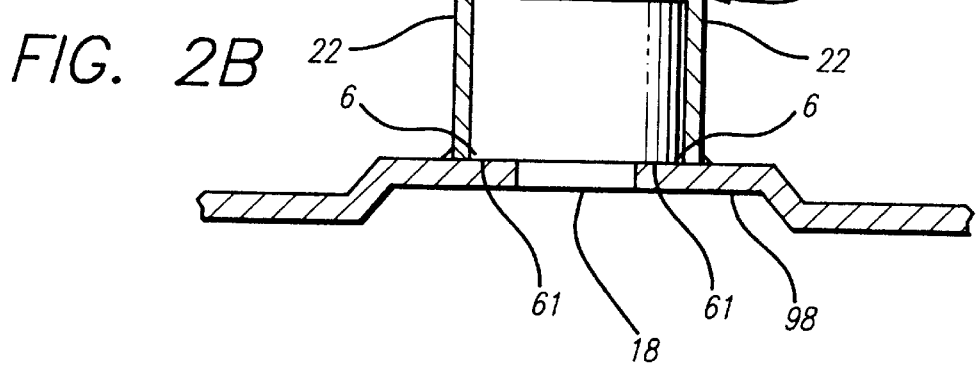
FIG. 2B is a cross-sectional view of a center portion of the adaptor wall, showing the aperture therein and the sleeve attached thereto.
Figure 3:
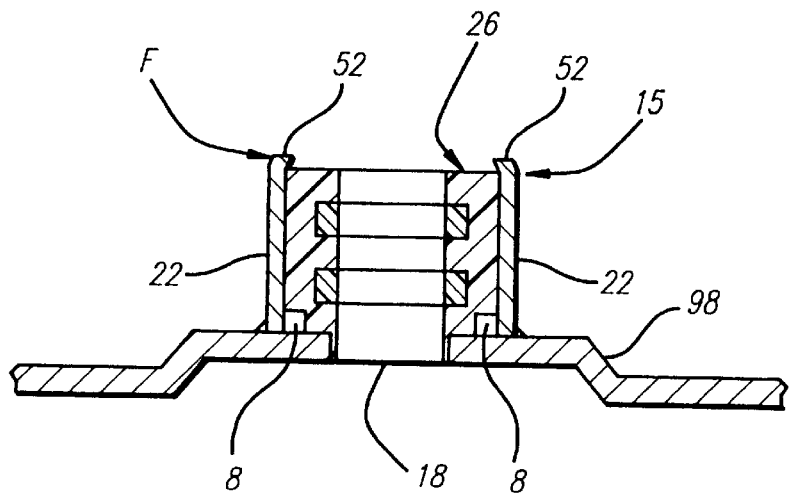
FIG. 3 is a cross-sectional view of the portion of the adaptor wall shown in FIG. 2B with the addition of the bushing, sealing element, and rod of FIG. 2A, inserted within the sleeve, and the top of the sleeve crimped.

As can be seen in FIG. 2B and FIG. 3, the bushing assembly 15 includes a sleeve 22, which is affixed to the adaptor plate 98 in a location surrounding the aperture 18 such that the diameter of the aperture 18 is less than the interior diameter of the sleeve 22. This difference in diameter forms a lip 61 on the adaptor plate 98 between the circumference of the aperture 18 and the sleeve 22. The sleeve 22 also has a crimpable end 52, which is distant from the adaptor plate 98.

FIGS. 2A and 3 show the bushing 26 surrounding the spring brake push rod 80. The bushing 26 can be made of a number of injection moldable resins, and many such products are available commercially. For instance, NYLATRON™, a thermoplastic nylon 6/6 with a friction reducing molybdenum disulfate additive, has been found to be well suited to this use. The bushing 26 has an exterior wall 41, and an interior wall 29 which includes one or more grooves 28 running the circumference of the interior wall 29. Sealing rings 30 are mounted in each of these two grooves 28. The sealing rings 30 can be made of any number of materials capable of creating a fluid tight pressure seal. The interior wall 29 of the bushing 26 forms an aperture adapted to receive the spring brake push rod 80. The bushing 26 also has an upper end 37 and a lower end 39. The exterior wall 41 has a mounting groove 4 into which is fitted a mounting sealing ring 8. The mounting sealing ring 8 can be made of any number of materials capable of creating a fluid tight pressure seal.

FIG. 3 shows the adaptor plate 98 and sleeve 22 of FIG. 2B, with the bushing 26 of FIG. 2A inserted. As can be seen, the exterior wall 41 of the bushing 26 is flush against the interior of the sleeve 22. The lower end 39 of the bushing 26 is restrained by the lip 61. The mounting sealing ring 8 creates a seal between the bushing 26, the sleeve 22, the lip 61, and the sealing ring 8. This allows a fluid tight condition to be maintained even if the sleeve 22 is improperly mounted or the bushing 26 is not flush against the sleeve 22.

A preferred embodiment of the present invention is assembled by first producing the above-described bushing 26 (by molding or other means). Then the sleeve 22 is coupled to the adaptor plate 98 (by welding or other means), and the sealing ring 8 is inserted onto the lip 61. The bushing 26 is then inserted into the sleeve 22, and force is applied to a crimpable end 52 of the sleeve 22, deforming it inward towards the bushing 26. Comparing FIG. 2B with FIG. 3 it can be seen how the inward bending of the crimpable end 52 secures the bushing 26. Then the sealing rings 30 are inserted into the grooves 28 of the bushing 26. Finally, the spring brake push rod 80 is inserted through the now completed bushing assembly 15.

In operation, when normal braking fluid pressure is maintained, the fluid pressure in the spring brake pressure chamber 74 urges the spring brake diaphragm 78 in opposition to the compressed spring 72. In this equilibrium condition, there is no movement of the spring brake push rod 80. Such a condition is maintained, in part due to the fact that the bushing assembly 15 prevents escape of the pressurized fluid in the spring brake pressure chamber 74 through the aperture 18 (FIG. 3). Should the pressure in the spring brake pressure chamber 74 decrease, below the level necessary to oppose the movement of the spring 72, the spring 72 will urge the spring brake plate 76 away from the spring 72, which will in turn transmit such movement to the spring brake diaphragm 78, the spring end 45 of the spring brake push rod 80 and therethrough to its adaptor end 92, the service brake diaphragm 90, the plate end 88 of the service brake push rod 84 and therethrough to its guide end 86, which in turn activates the brakes (not shown). Such a loss of fluid pressure can occur due to malfunction (in which case the vehicle will stop rather than proceed without properly functioning brakes) or if the operator "bleeds" the fluid in order to manually activate the spring brake (perhaps for use as a parking brake).

Thus, a pressure seal is maintained between the spring brake pressure chamber 74 and the service brake pressure chamber 94, while allowing the spring brake push rod 80 to pass therebetween. In addition to creating a pressure seal, the bushing assembly 15 allows for deviation in the angle of movement of the spring brake pressure rod 80, due to the fact that the bushing 26 is elastically deformable.

Other embodiments of the present invention can be constructed by those skilled in the art without departing from the spirit and scope of the invention.

We claim:

1. A bushing assembly permitting a push rod to pass through an aperture in an adapter plate forming an outer wall of a pressure chamber, said bushing assembly comprising:

a tubular sleeve having an outer surface and a cylindrical interior oriented about a longitudinal axis extending from a first end of the sleeve to a second end of the sleeve, the first end of the sleeve being welded to the adapter plate such that the cylindrical interior is generally aligned with the aperture and the longitudinal axis is generally perpendicular to the outer wall of the pressure chamber;

a circumferential stop rigidly coupled to the tubular sleeve and extending inwardly into said cylindrical interior at said first end of the tubular sleeve;

a cylindrical bushing having a first end, a second end, an interior wall and an exterior wall, the first end of the bushing being retained within the cylindrical interior of the sleeve by the circumferential stop, the second end of the bushing being retained within the cylindrical interior of the sleeve by substantially inwardly deforming the second end of the sleeve adjacent the second end of the bushing, the interior wall of the bushing being adapted to directly receive and guide the push rod, the exterior wall of the bushing being in contact relationship with the cylindrical interior of the sleeve;

a first sealing element disposed between the bushing and the push rod; and a second sealing element disposed between the adapter plate and the bushing.

2. The bushing assembly of claim 1, wherein said first sealing element comprises an elastomeric ring retained within a groove defined on the interior wall of said bushing.

3. The bushing assembly of claim 1, wherein said bushing is made of injection moldable resins.

4. The bushing assembly of claim 3, wherein said bushing is made of Nylon 6/6 with a molybdenum disulfate additive.

5. The bushing assembly of claim 1, wherein said tubular sleeve has a constant internal cross section greater than said aperture.

6. The bushing assembly of claim 1, wherein said second sealing element comprises an elastomeric ring retained within a groove defined on the first end of said bushing.

7. A bushing assembly permitting a push rod to pass through an aperture in an adapter plate forming an outer wall of a pressure chamber, said bushing assembly comprising:

a tubular sleeve having an outer surface and a cylindrical interior, the cylindrical interior being oriented about a longitudinal axis extending from a first end of the sleeve to a second end of the sleeve and having an associated interior diameter that is greater than a corresponding diameter of said adapter plate aperture, the first end of the sleeve being rigidly coupled to the adapter plate about a periphery of the aperture such that the cylindrical interior is generally aligned with the aperture and the longitudinal axis is generally perpendicular to the outer wall of the pressure chamber;

a first circumferential stop rigidly coupled to the tubular sleeve and extending inwardly into said cylindrical interior at said first end of the tubular sleeve;

a cylindrical bushing having a first end, a second end, an interior wall and an exterior wall, the first end of the bushing being retained within the cylindrical interior of the sleeve by the circumferential stop, the second end of the bushing being retained within the cylindrical interior of the sleeve by substantially inwardly deforming the sleeve adjacent of the second end of the sleeve, the interior wall of the bushing being adapted to directly receive and guide the push rod, the exterior wall of the bushing being in contact relationship with the cylindrical interior of the sleeve;

a first sealing element disposed between the bushing and the push rod; and a second sealing element disposed between the adapter plate and the bushing.

8. The bushing assembly of claim 7, wherein said tubular sleeve is welded to said adaptor plate.

9. The bushing assembly of claim 8, wherein said circumferential stop is formed by the periphery of the aperture.

10. The bushing assembly of claim 9, wherein said first sealing element comprises an elastomeric ring retained within a groove defined on the interior wall of said bushing.

11. The bushing assembly of claim 10, wherein said second sealing element comprises an elastomeric ring retained within a groove defined on the first end of said bushing.

12. A double diaphragm brake actuator, comprising:

a spring brake actuator comprising a push rod and a first pressure chamber;

a service brake actuator comprising a second pressure chamber;

an adapter plate for coupling the spring brake actuator to the service brake actuator, said adapter plate forming a shared wall between the first pressure chamber and the second pressure chamber and defining an aperture for allowing the push rod to pass through from the first pressure chamber to the second pressure chamber; and a bushing assembly for facilitating passage of the push rod through the aperture in the adapter while maintaining a fluid tight seal between the first pressure chamber and the second pressure chamber, said bushing assembly including a tubular sleeve having an outer surface and a cylindrical interior oriented about a longitudinal axis extending from a first end of the sleeve to a second end of the sleeve, the first end of the sleeve being welded to the adapter plate such that the cylindrical interior is generally aligned with the aperture and the longitudinal axis is generally perpendicular to the shared wall;

a circumferential stop rigidly coupled to the tubular sleeve and extending inwardly into said cylindrical interior at said first end of the tubular sleeve;

a cylindrical bushing having a first end, a second end, an interior wall and an exterior wall, the first end of the bushing being retained within the cylindrical interior of the sleeve by the circumferential stop, the second end of the bushing being retained within the cylindrical interior of the sleeve by substantially inwardly deforming the sleeve adjacent of the second end of the sleeve, the interior wall of the bushing being adapted to directly receive and guide the push rod, the exterior wall of the bushing being in contact relationship with the cylindrical interior of the sleeve as said push rod cycles back and forth;

a first sealing element disposed between the bushing and the push rod; and a second sealing element disposed between the shared wall and the bushing.

13. The double diaphragm brake actuator of claim 12, wherein said first sealing element comprises an elastomeric ring retained within a groove defined in the interior wall of said bushing.

14. The double diaphragm brake actuator of claim 12, wherein said bushing is made of injection moldable resins.

15. The double diaphragm brake actuator of claim 14, wherein said bushing is made of Nylon 6/6 with a molybdenum disulfate additive.

16. The double diaphragm brake actuator of claim 12, wherein said tubular sleeve has a constant internal cross section greater than said aperture.

17. The double diaphragm brake actuator of claim 12, wherein said second sealing element comprises an elastomeric ring retained within a groove defined on the first end of said bushing.

18. A double diaphragm brake actuator, comprising:
a spring brake actuator comprising a push rod and a first pressure chamber;
a service brake actuator comprising a second pressure chamber;
an adapter plate for coupling the spring brake actuator to the service brake actuator, said adapter plate forming a shared wall between the first pressure chamber and the second pressure chamber and defining an aperture for allowing the push rod to pass through from the first pressure chamber to the second pressure chamber; and
a bushing assembly for facilitating passage of the push rod through the aperture in the adapter while maintaining a fluid tight seal between the first pressure chamber and the second pressure chamber, said bushing assembly including
a tubular sleeve having an outer surface and a cylindrical interior oriented about a longitudinal axis extending from a first end of the sleeve to a second end of the sleeve and having an associated interior diameter that is greater than a corresponding diameter of said adapter plate aperture, the first end of the sleeve being rigidly coupled to the adapter plate about the adapter plate aperture such that the cylindrical interior is generally aligned with the aperture and the longitudinal axis is generally perpendicular to said shared wall;
a circumferential stop rigidly coupled to the tubular sleeve and extending inwardly into said cylindrical interior at said first end of the tubular sleeve;
a cylindrical bushing having a first end, a second end, an interior wall and an exterior wall, the first end of the bushing being retained within the cylindrical interior of the sleeve by the circumferential stop, the second end of the bushing being retained within the cylindrical interior of the sleeve by substantially inwardly deforming the sleeve adjacent of the second end of the sleeve, the interior wall of the bushing being adapted to directly receive and guide the push rod, the exterior wall of the bushing being in contact relationship with the cylindrical interior of the sleeve as said push rod cycles back and forth;
a first sealing element disposed between the bushing and the push rod; and
a second sealing element disposed between the shared wall and the bushing.

19. The double diaphragm brake actuator of claim 18, wherein said tubular sleeve is welded to said adaptor.

20. The double diaphragm brake actuator of claim 19, wherein said circumferential stop is formed by the periphery of the aperture.

21. The double diaphragm brake actuator of claim 20, wherein said first sealing element comprises an elastomeric ring retained within a groove defined on the interior wall of said bushing.

22. The double diaphragm brake actuator of claim 21, wherein said second sealing element comprises an elastomeric ring retained within a groove defined on the first end of said bushing.

* * * * *